US007379842B2

(12) United States Patent
Alexander

(10) Patent No.: US 7,379,842 B2
(45) Date of Patent: May 27, 2008

(54) HANG TIMER FOR DETERMINING TIME OF FLIGHT OF AN OBJECT

(75) Inventor: Jeffrey Michael Alexander, North Bend, WA (US)

(73) Assignee: Drop Zone Corp., North Bend, WA (US)

( * ) Notice: Subject to any disclaimer, the term of this patent is extended or adjusted under 35 U.S.C. 154(b) by 0 days.

(21) Appl. No.: 11/207,858

(22) Filed: Aug. 18, 2005

(65) Prior Publication Data

US 2006/0167623 A1 Jul. 27, 2006

Related U.S. Application Data

(60) Provisional application No. 60/646,742, filed on Jan. 25, 2005.

(51) Int. Cl.

| | |
|---|---|
| ***G01B 7/14*** | (2006.01) |
| ***G01B 11/14*** | (2006.01) |
| ***G01C 22/00*** | (2006.01) |
| ***G04F 1/00*** | (2006.01) |
| ***G04F 3/00*** | (2006.01) |
| ***G04F 10/00*** | (2006.01) |

(52) U.S. Cl. ...................................... 702/160; 702/176

(58) Field of Classification Search ................ 702/141, 702/160, 176

See application file for complete search history.

(56) References Cited

U.S. PATENT DOCUMENTS

| | | | | |
|---|---|---|---|---|
| 5,636,146 | A | 6/1997 | Flentov et al. | 702/176 |
| 5,779,576 | A * | 7/1998 | Smith et al. | 473/570 |
| 5,960,380 | A | 9/1999 | Flentov et al. | 702/178 |
| 6,073,086 | A * | 6/2000 | Marinelli | 702/141 |
| 6,496,787 | B1 | 12/2002 | Flentov et al. | 702/150 |
| 6,499,000 | B2 | 12/2002 | Flentov et al. | 702/178 |
| 6,516,284 | B2 | 2/2003 | Flentov et al. | 702/142 |
| 6,856,934 | B2 * | 2/2005 | Vock et al. | 702/149 |

* cited by examiner

*Primary Examiner*—Michael P. Nghiem
(74) *Attorney, Agent, or Firm*—Woodcock Washburn LLP

(57) ABSTRACT

The invention disclosed herein relates to systems and methods for detecting, calculating, and displaying the time-of-flight or hang-time of a moving and jumping object such as a skier or snowboarder by using at least one accelerometer secured within a small wearable device. In one embodiment, the inventive device comprises: a static acceleration detection means for detecting the static acceleration of the object over at least first, second, and-third periods of time as the object respectively moves, jumps in at least first, second, and third trajectories, and lands at least first, second, and third times along the surface thereby defining at least respective first, second, and third time-of-flight events; a calculating means for determining the approximate time-of-flight of the object during the first, second, and third time-of-flight events; and a display means for displaying in a readable format the approximate time-of-flights associated with the first, second, and third time-of-flight events.

8 Claims, 8 Drawing Sheets

Hang Timer Flow Chart

High Level Flow Chart

Hang-Timer Displays (Examples)

"AVERAGE Hang-Time"

"TOTAL Hang-Time"

"Current Hang-Time"

"Hang-Time History "

Hang Timer Flow Chart

High Level Flow Chart

Pseudo Code:

```
Initialize Device:
        Reset HangTime
        Reset CurrentTime
        Reset BestTime
        Reset LastTime
        Reset TotalTime
        Reset DisplayDataFlag

Start:
        If DisplayData Then Goto Update Display

Request 1:
        Request Acceleration on Axis 1
        If Acceleration greater than 1/2 G
                Goto Start

Request 2:
        Request Acceleration on Axis 2
        If Acceleration greater than 1/2 G
                Goto Start

Request 3:
        Request Acceleration on Axis 3
        If Acceleration greater than 1/2 G
                Goto Start

ZeroG:
        Increment HangTime
        Set DisplayData
        Goto Request1

DisplayData:
        Copy CurrentTime to LastTime
        Copy HangTime to CurrentTime
        Add HangTime Counter to TotalTime

        If HangTime Counter to TotalTime
                Then copy HangTime to BestTime

        Display Times
        Clear DisplayDataFlag
        Goto Start
```

Figure 6B

HANG TIMER FOR DETERMINING TIME OF FLIGHT OF AN OBJECT

CROSS REFERENCE TO RELATED APPLICATIONS

This application claims priority to U.S. Provisional Application Ser. No. 60/646,742, filed Jan. 25, 2005, which is hereby incorporated by reference in its entirety.

TECHNICAL FIELD

The present invention relates to the determining of time-of-flight of an object, and more particularly, to mechanisms for detecting and calculating the "hang-time" associated with a moving and jumping object.

BACKGROUND

Accelerometers have found real-time applications in controlling and monitoring military and aerospace systems. For example, the basis of many modern inertial guidance systems is an arrangement that comprises three mutually perpendicular accelerometers, which can measure forces in any direction in space, coupled with three gyroscopes, also with mutually perpendicular axes, which constitute an independent frame of reference. An accelerometer measures acceleration or, more particularly, the rate at which the velocity of an object is changing. Because acceleration cannot be measured directly, an accelerometer measures the force exerted by restraints that are placed on a reference mass to hold its position fixed in an accelerating body (such as, for example, a suspended mass secured by springs within a housing). As is appreciated by those skilled in the art, acceleration is generally computed using the relationship between restraint force and acceleration given by Newton's second law: force=mass×acceleration.

The output of an accelerometer is generally in the form of a varying electrical voltage. As an object (attached to an accelerometer) accelerates, inertia causes the reference to lag behind as its housing moves ahead (accelerates with the object). The displacement of the suspended mass within its housing is proportional to the acceleration of the object. This displacement may be converted to an electrical output signal by a pointer (fixed to the mass), for example, moving over the surface of a potentiometer. Because the current supplied to the potentiometer remains constant, the movement of the pointer causes the output voltage to vary directly with the acceleration.

Specially designed accelerometers have been used in applications as varied as control of industrial vibration test equipment, detection of earthquakes (seismographs), and input to navigational an inertial guidance systems. The design differences are, primarily concerned with the method used to convert an accelerometer's output signal to an appropriate acceleration reading. In this regard an accelerometer's output may have two components: an output signal that is proportional to the force exerted by Earth's gravity at or near the surface of the earth (i.e., static acceleration), and another output signal that is proportional to the force exerted by shocks or vibrations (i.e., dynamic acceleration). Depending on the application, a signal-conditioning circuit may be required. With the advent of microelectromechanical systems (MEMS) technologies, the size and costs of accelerometers have been greatly reduced.

Recently, accelerometers have been used to detect the amount of time spent off the ground by a person during a sporting movement such as, for example, skiing, snowboarding, and biking. Exemplary in this regard are the devices disclosed in U.S. Pat. Nos. 5,636,146, 5,960,380, 6,496,787, 6,499,000, and 6,516,284. All of these closely related patent documents disclose, among other things, accelerometer-based apparatuses that are configured to sense vibrations (i.e., dynamic acceleration), particularly the vibrations experienced by a ski, snowboard, and/or bike that moves along a surface (e.g., a ski slope or mountain bike trial). In these systems, the voltage output signal from the accelerometer(s) provides a vibrational spectrum over time, and the amount of hang-time is ascertained by performing calculations on that spectrum. In particular, the vibrational spectrum sensed by these prior art devices are generally highly erratic and random, corresponding to the randomness of the surface underneath the ski, snowboard, and/or bike (as the case may be). During the period of time when the ski, snowboard, or bike is off the surface (i.e., during a "hang-time" event), however, the vibrational spectrum becomes relatively smooth because there are no longer any underlying vibrations impacting on the accelerometer(s). A microprocessor subsystem is then used to evaluate the vibrational spectrum and determine the approximate hang-tune from the duration of the relatively smooth portion sandwiched between two highly erratic and random vibrational spectrum portions. Because the condition of standing still (i.e., little or no movement) also results in a relatively smooth vibrational spectrum, these prior art devices require complicated timing methods to ensure that accurate results are displayed. In other words, the prior art devices have difficulty in accurately distinguishing between the conditions of standing still and experiencing hang-time.

Accordingly, there is still a need in the art for new and improved mechanisms for determining the time-of-flight or hang-time of a moving and jumping object such as, for example, a skier, snowboarder, skater, biker, or jumper. The present invention fulfills these needs and provides for further related advantages.

BRIEF DESCRIPTION OF THE DRAWINGS

The drawings are intended to be illustrative and symbolic representations of certain exemplary embodiments of the present invention and as such they are not necessarily drawn to scale.

FIG. 6B is pseudo code that corresponds to the flow chart of FIG. 6A.

SUMMARY

Figure 1:
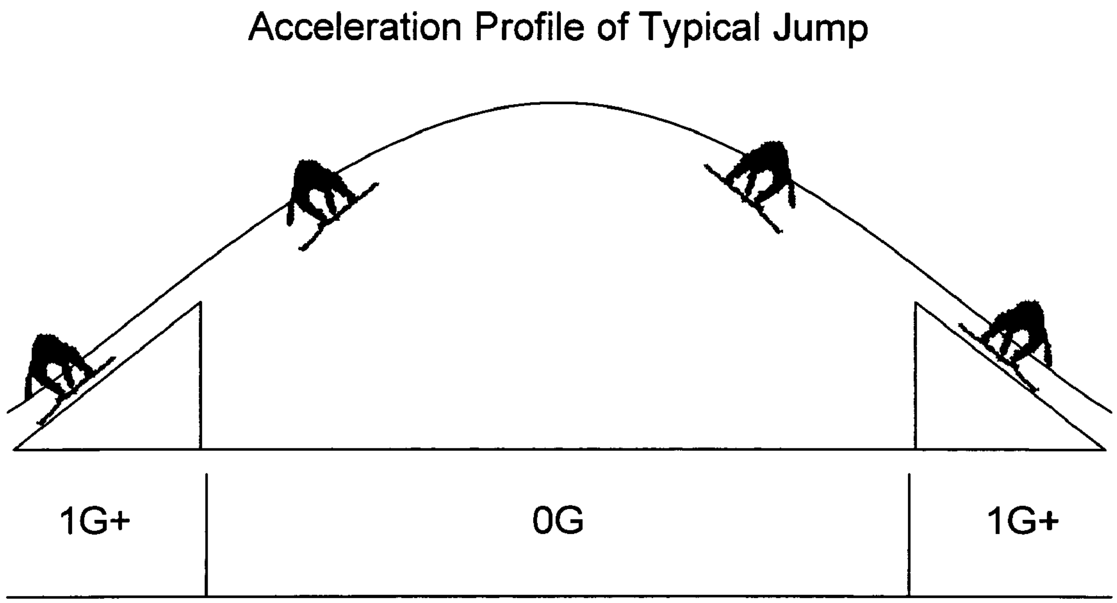
FIG. 1 is an illustration of a snowboarder (i.e., a type of jumper) moving along a surface, jumping in a trajectory, and then landing; in so doing, the snowboarder experiences a static acceleration of (i) about 1 g when he or she is contacting or on the surface and (ii) about 0 g when he or she is not contacting or off the surface.

In brief, the present invention is directed to mechanisms for detecting, calculating, and displaying the time-of-flight or hang-time of a moving and jumping object such as, for example, a skier or snowboarder by using, in novel ways, one or more accelerometers secured within a small wearable device. In one embodiment, the present invention is directed to a device for determining an approximate time-of-flight of an object that moves, jumps, and lands along a surface of the earth. The object has a static acceleration of (i) about 1 g when the object is contacting or on the surface, and (ii) about 0 g when the object is not contacting or off the surface. In this embodiment, the device comprises: a housing; one or more accelerometers within the housing, the one or more accelerometers being configured to detect the linear or static acceleration of the object over at least first, second, and third periods of time as the object respectively moves, jumps in at least first, second, and third trajectories, and lands at least first, second, and third times along the surface thereby defining at least respective first, second, and third time-of-flight events, the one or more accelerometers being further configured to transmit at least first, second, and third accelerometer output electrical (voltage) signals that corresponds to the static acceleration of the object during the first, second, and third time-of-flight events; a microprocessor in electrical communication with the one or more accelerometers, the microprocessor being configured to calculate the approximate time-of-flight of the object during the first, second and third time-of-flight events from the first, second, and third accelerometer output electrical signals respectively, the microprocessor being further configured to transmit at least first, second, and third microprocessor output electrical signals that correspond to the calculated approximate time-of-flights of the object during the first, second, and third time-of-flight events; and a display screen in electrical communication with the microprocessor, the display screen being configured to display in a readable format the approximate time-of-flights associated with the first, second, and third time-of-flight events.

In another embodiment, the present invention is directed to a method for determining approximate time-of-flights of a skier or snowboarder that moves, jumps, and lands a plurality of times along a surface of a ski slope. The skier or snowboarder has a linear or static acceleration of (i) about 1 g when the skier or snowboarder is contacting or on the surface, and (ii) about 0 g when the skier or snowboarder is not contacting or off the surface. In this embodiment, the method comprises at least the following steps: detecting by use of one or more accelerometers the static acceleration of the skier or snowboarder over a first period of time as the skier or snowboarder moves, jumps in a first trajectory, and then lands for a first time along the surface thereby defining a first time-of-flight event; calculating from the detected static acceleration over the first period of time the approximate time-of-flight of the skier or snowboarder; detecting the static acceleration of the skier or snowboarder over a second period of time as the skier or snowboarder moves, jumps in a second trajectory, and then lands for a second time along the surface thereby defining a second time-of-flight event; calculating from the detected static acceleration over the second period of time the approximate time-of-flight of the skier or snowboarder; comparing the calculated approximate time-of-flights of the skier or snowboarder over the first and second period of times to determine the (i) cumulative time-of-flight, and (ii) the time-of-flight; and displaying on a display screen the (i) cumulative time-of-flight, and (ii) best time-of-flight.

These and other aspects of the present invention will become more evident upon reference to the following detailed description and attached drawings. It is to be understood, however, that various changes, alterations, and substitutions may be made to the specific embodiments disclosed herein without departing from their essential spirit and scope. In addition, it is to be further understood that the drawings are intended to be illustrative and symbolic representations of certain exemplary embodiments of the present invention and as such they are not necessarily drawn to scale. Finally, it is expressly provided that all of the various references cited herein are incorporated herein by reference in their entireties for all purposes.

DETAILED DESCRIPTION

As noted above, the present invention is directed to mechanisms for detecting, calculating, and displaying the time-of-flight(s) or hang-time(s) of a moving and jumping object such as, for example, a skier or snowboarder by using, in novel ways, one or more accelerometers secured within a small wearable device. As used herein, the terms time-of-flight and hang-time are synonymous and simply refer to the amount or period of time that a selected object is not contacting or off a surface of the earth. Thus, and in one embodiment, the present invention is directed to an accelerometer-based device for determining approximate time-of-flights of hang-times of a skier or snowboarder who moves, jumps, and lands a plurality of times along a surface of a ski slope. As is appreciated by those skilled in the art, a skier or snowboarder will experience a static acceleration of (i) about 1 g when the skier or snowboarder is contacting or on the surface, and (ii) about 0 g when the skier or snowboarder is not contacting or off the surface because he or she has projected off a jump. FIG. 1 provides an exemplary illustration of an experienced snowboarder (i.e., a type of jumper) moving along a ski slope surface, jumping in a trajectory, and then landing. By using one or more accelerometers (e.g., a tri-axis accelerometer) secured within a preferably liquid-tight housing and worn by the skier or snowboarder (preferably near his or her center of mass), the linear or static acceleration of the skier or snowboarder may be detected and, in turn, his or her time-of-flight or hang-time may be determined.

Figure 2:
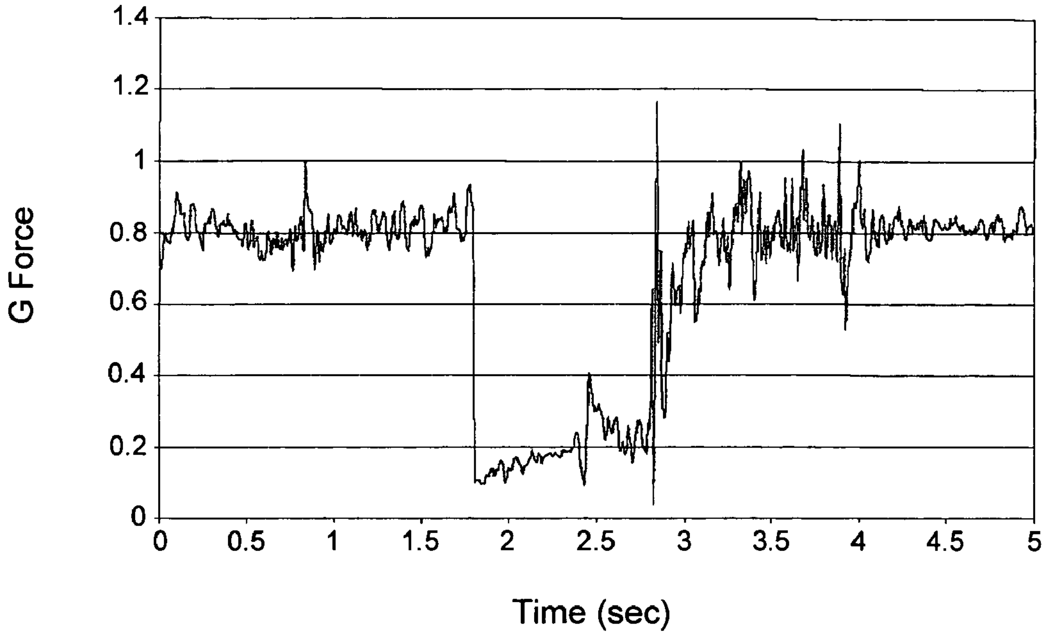
FIG. 2 is a graph showing an acceleration profile of a typical hang-time event (corresponding to the snowboarder depicted in FIG. 1), wherein the x-axis plots time in m/sec and the y-axis plots acceleration in g's.

More specifically, the time-of-flight or hang-time of a skier or snowboarder may be determined in accordance with the present invention by generating a static acceleration profile (one or more accelerometer output signals) over a period of time that includes at least one moving, jumping, and landing event; and then appropriately analyzing the static acceleration profile. FIG. 2 provides an exemplary graph showing the static acceleration profile (i.e., output signal of an appropriately configured tri-axis accelerometer) of the hang-time event corresponding to the snowboarder depicted in FIG. 1, (wherein the x-axis plots time in m/sec and the y-axis plots acceleration in g's). As shown, the snowboarder experiences a static acceleration of about 1 g when he or she is moving along the surface, about 0 g's after jumping and when off the surface, and about 1 g when he or she is again moving along the surface after landing. In view of the static acceleration profile generated by an appropriately configured and MEMS-based tri-axis accelerometer, the time-of flight or hang-time of the snowboarder may be readily calculated as it corresponds to the interval or period of time when the static acceleration output signal provides a reading of about 0 g's (as opposed to about 1 g which generally corresponds to a grounded experience).

Alternatively, a first and second dual axis accelerometer can be configured to detect a first, second, and third static acceleration component of the object along three mutually perpendicular axes defined as an x-axis, y-axis, and z-axis respectively. In such a scenario, a static acceleration of an object over a period of time would be equal to the vector sum of the first, second and third static, acceleration components.

Figure 3:
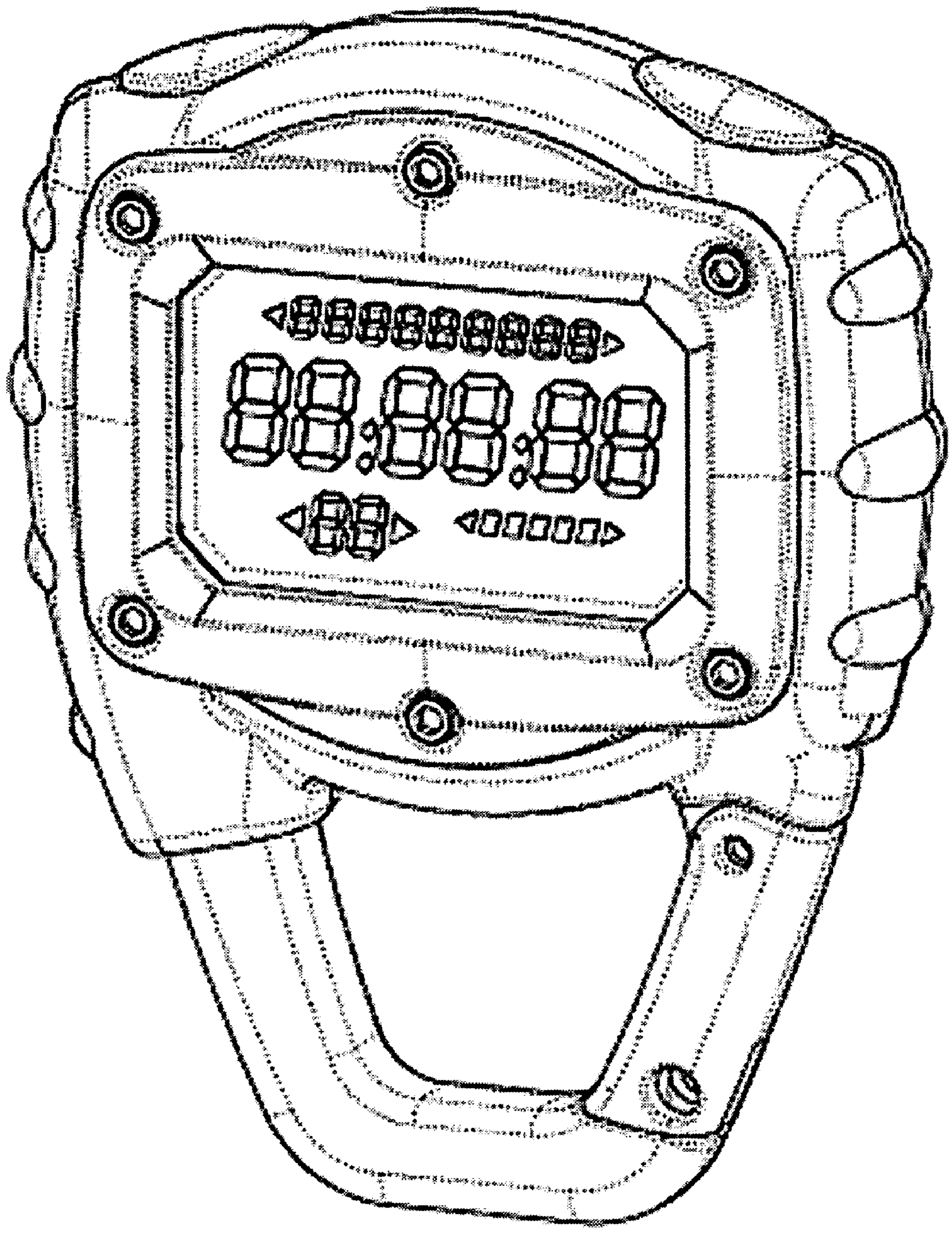
FIG. 3 is a front elevational view of a hang-timer device in accordance with an embodiment of the present invention.
Figure 4:
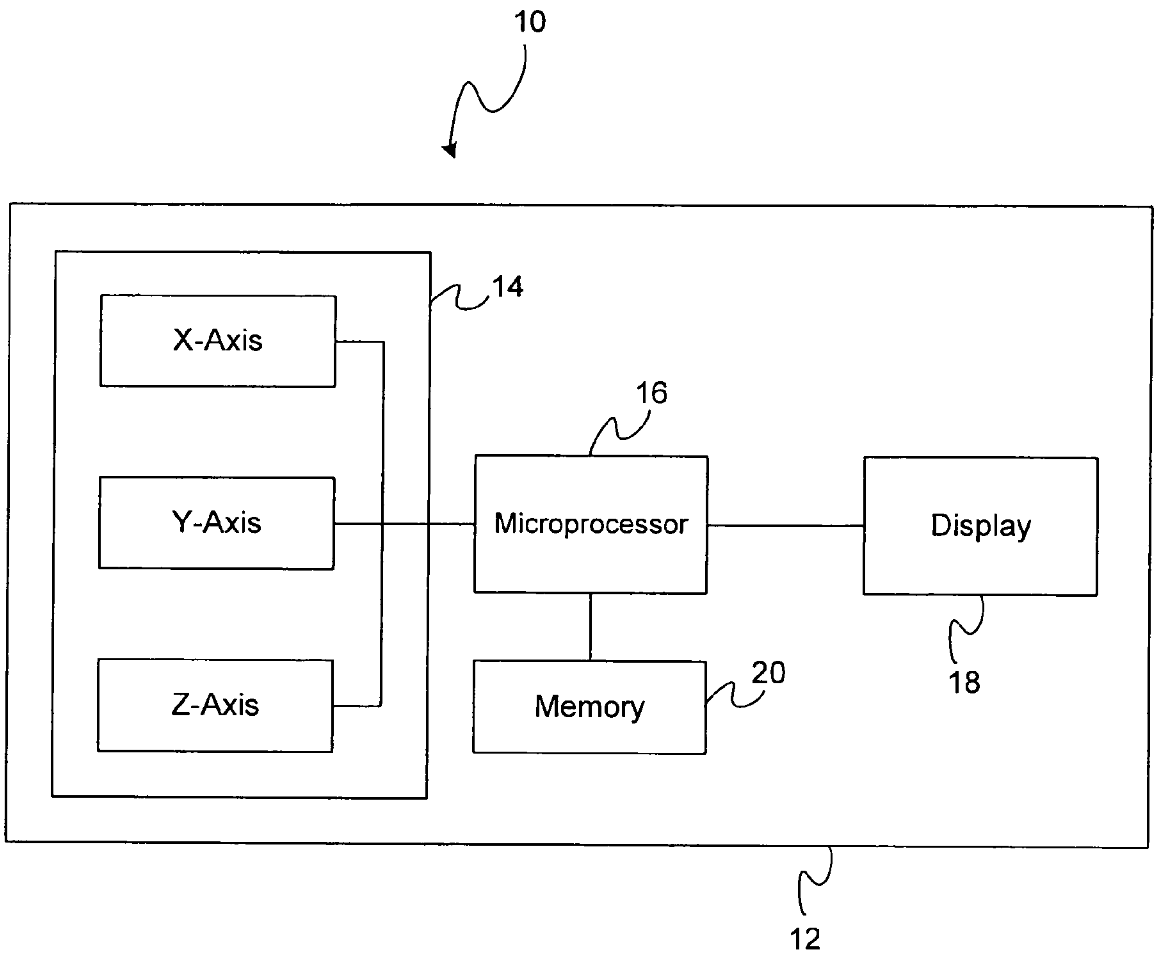
FIG. 4 is a schematic representation showing the interrelation among the various components of the hang-timer device illustrated in FIG. 3.
Figure 5A:
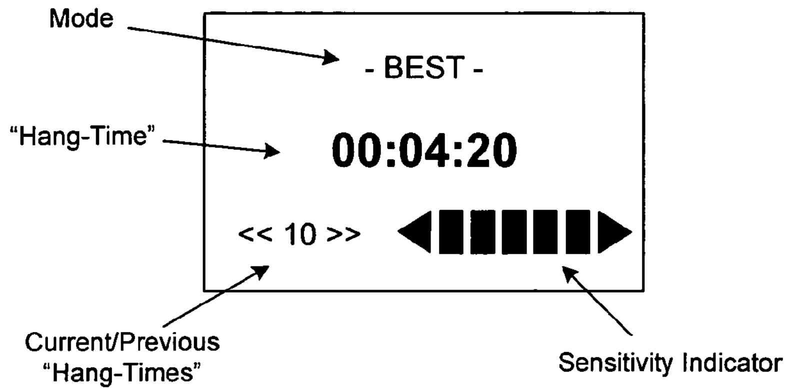
FIGS. 5A, 5B, 5C, 5D, and 5E provide exemplary screen shots of possible displays of the hanger-tier device illustrated in FIGS. 3 and 4.
Figure 5B:
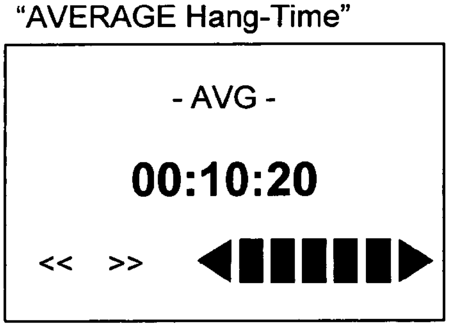
Figure 5D:
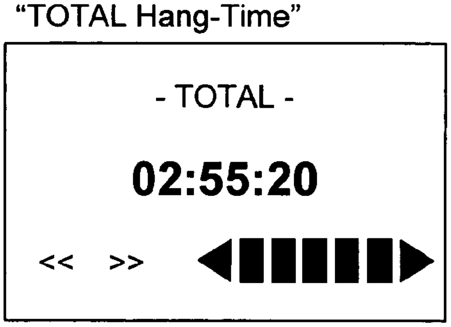
Figure 5C:
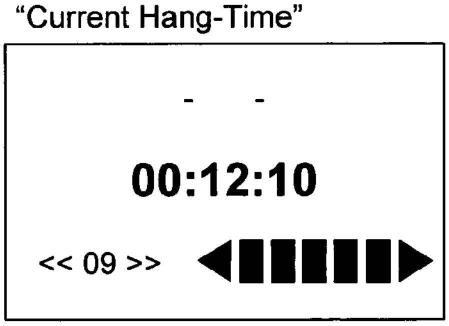
Figure 5E:

Thus, and in view of the foregoing and with reference to FIGS. 3 and 4, the present invention in one embodiment is directed to a small wearable device that is designed and configured to determine the approximate time-of-flight or hang-time of an object such as, for example, a skier, a snowboarder, a skater, a biker, or a jumper who moves, jumps, and lands along a surface of the earth. As shown in FIGS. 3 and 4, the device 10 comprises a housing 12; one or more accelerometers 14 secured within the housing 12; a microprocessor 16 in electrical communication with the one or more accelerometers 14; and a display screen 18 in electrical communication with the microprocessor 16. The housing 12 is preferably made of a two-piece rigid plastic material such as a polycarbonate; however, it may be made of a metal such as stainless steel. The housing 12 preferably encloses in an essentially liquid-tight, manner the one or more accelerometers 14 and the microprocessor 16 (as well as a battery (not shown) used as the power source). The one or more accelerometers 14 is/are preferably a single MEMS-based linear tri-axis accelerometer that functions on the principle of differential capacitance. As is appreciated by those skilled in the art, acceleration causes displacement of certain silicon structures resulting in a change in capacitance. A signal-conditioning CMOS (complementary metal oxide semiconductor) ASIC (application-specific integrate circuit) embedded and provided with the accelerometer is capable of detecting and transforming changes in capacitance into an analog output voltage, which is proportional to acceleration. The output signals are then sent to the microprocessor 16 for data manipulation and time-of-flight calculations.

In accordance with the present invention, the one or more accelerometers 14 are generally configured to detect the static acceleration over at least first, second, and third periods of time as the skier, snowboarder, skater, biker, or jumper (not shown) respectively moves, jumps in at least first, second and third trajectories, and lands at least first, second, and third times along the surface. In so doing, the skier, snowboarder, skater, biker, or jumper defines at least respective first, second, and third time-of-flight events. The one or more accelerometers 14 are generally further configured to transmit at least first, second, and third accelerometer output electrical signals (not shown) that corresponds to the static acceleration of the skier, snowboarder, skater, biker, or jumper during the first, second, and third time-of-flight events. In addition, the microprocessor 16 is generally configured to calculate the approximate time-of-flight of the skier, snowboarder, skater, biker, or jumper during the first, second, and third time-of-flight events from the first, second, and third accelerometer output electrical signals respectively (which may be pulse width modulated (PWM) signals). The microprocessor 16 is generally further configured to transmit at least first, second, and third microprocessor output electrical (voltage) signals (not shown) that correspond to the calculated approximate time-of-flights of the skier, snowboarder, skater, biker, or jumper during the first, second, and third time-of-flight events.

In this regard, the microprocessor 16 is generally configured (by means of appropriate programming as is appreciated by those skilled in the art) to calculate (i) the cumulative time-of-flight associated with the first, second, and third time-of-flight events, and (ii) the greatest time-of-flight selected from the first, second, and third time-of-flight events. The microprocessor 16 is also configured to calculate (iii) the average time-of-flight of the first, second, and third time-of-flight events.

The device 10 may further comprise a memory component 20 that is in electrical communication with the microprocessor 16. The memory component 20 is generally configured to store one or more values that correspond to the approximate time-of-flights associated with the first, second, and third time-of-flight events. Moreover, the-memory component 20 may be configured to store a plurality values that correspond to (i) the approximate time-of-flights associated with the first, second, and third time-of-flight events (thereby providing a history of different time-of-flights), (ii) the cumulative time-of-flight associated with the first, second, and third time-of-flight events, and (iii) the greatest time-of-flight selected from the first, second, and third time-of-flight events.

Finally, and as shown, the display screen 18 is in electrical communication with the microprocessor 16. As shown, the display screen 18 is preferably on a face of the housing 12. The display screen 18 is generally configured to display in a readable format the approximate time-of-flights associated with the first, second, and third time-of-flight events. Exemplary screen shots of several possible output displays of the display screen 18 are provided as FIGS. 5A-E.

The output displays may be liquid-crystal displays (LCDs), such as monochrome Standard LCD with an electroluminescent backlight. The backlight can be activated when pressing a button and remain active until no buttons are pressed for several seconds. Moreover, as for the layout of the display, as is shown in FIGS. 5A-5E, the type of hang-time that can be displayed varies: it can be either the "Best" hang-time (FIG. 5A), the "Average" or "Avg" hang-time (FIG. 5B), the "Total" hang-time (FIG. 5C), the "Current" hang-time, the "History" of hang-times (FIG. 5E), and so on.

Furthermore, the device can not only display these various times, but it can also display other information when it is used in different modes. For example, in hang-timer mode, as mentioned above, a best time, an average time, a total time, a current time, and a history of times can be displayed (additionally, as indicated above, the sensitivity of measuring hang-time can be displayed). In temperature mode, the temperature can be displayed, either in degrees Celsius or Fahrenheit, with current, low, and high temperatures. In stopwatch mode, the device provides typical features found in a stopwatch, including lap times, set times, counting times, and so on. In clock mode, the device provides typical features found in a clock or watch, including the current time, date, and so on. Finally, in set mode, the device allows the setting of times, months, years, and so on. These five modes discussed above, hang-timer mode, temperature mode, stopwatch mode, clock mode, and set mode, are merely exemplary modes and other equivalent modes are provided by the device which would be apparent to any person skilled in the art.

Just as an example of one particular feature in one particular mode, the sensitivity function in the hang-timer mode allows for the adjustment of sensitivity when measuring hang-time. Thus, if the sensitivity is set on a first level, any hang-times less than 0.1 seconds are ignored. Conversely, if the sensitivity is set on a fifth level, any hang-times less than 2 seconds are ignored. Of course, there are intervening levels between the first and the fifth level, with corresponding time intervals. Furthermore, the 0.1 seconds and 2 seconds values for the first and fifth levels, respectively, are just exemplary, and may be adjusted and set differently depending on the context in which the device is used. For example, the device may have different levels of sensitivity for snowboarding than for mountain biking.

In another aspect, the present invention is directed to methods for determining approximate time-of-flights of a skier or snowboarder (as well as a skater, a biker, or a jumper depending on the scenario) who moves, jumps, and lands a plurality of times along a surface. The method of the present invention generally comprises at least the following steps: detecting by use of one or more accelerometers secured within a housing the static acceleration of a skier or snowboarder over a first period of time as the skier or snowboarder moves, jumps in a first trajectory, and lands for a first time along a surface thereby defining a first time-of-flight event; calculating from the detected static acceleration over the first period of time the approximate time-of-flight of the skier or snowboarder during the first time-of-flight event; detecting the static acceleration of the skier or snowboarder over a second period of time as the skier or snowboarder moves, jumps in a second trajectory, and lands for a second time along the surface thereby defining a second time-of-flight event; calculating from the detected static acceleration over the second period of time the approximate time-of-flight of the skier or snowboarder during the second time-of-flight event; comparing the calculated approximate time-of-flights of the skier or snowboarder over the first and second period of times, and determining one or both of (i) the cumulative time-of-flight over the first and second period of times, and (ii) the greater time-of-flight selected between the first and second time-of-flight events. The cumulative and greater time-of-flights may then be displayed on a display screen situated on a face of the device as (i) a first numeric value representative of the cumulative time-of-flight, and (ii) a second numeric value representative of the greater time-of-flight.

In further embodiments of this inventive method, the calculated approximate time-of-flights of the skier or snowboarder over the first and second period of times may be compared so as to determine (iii) the average time-of-flight over the first and second period of times. The average time-of-flight may then be displayed on the display screen as (iii) a third numeric value representative of the average time-of-flight.

In still further embodiments of this inventive method, the static acceleration of the skier or snowboarder over a third period of time is detected as the skier or snowboarder moves, jumps in a third trajectory, and lands for a third time along the surface thereby defining a third time-of-flight event. In this further embodiment, the additional steps comprise at least: calculating from the detected static acceleration over the third period of time the approximate time-of-flight of the skier or snowboarder during the third time-of-flight event; comparing the calculated approximate time-of-flights of the skier or snowboarder over the first, second, and third period of times, and determining (i) the cumulative time-of-flight over the first, second, and third period of times, and (ii) the greatest time-of-flight selected from the first, second, and third time-of-flight events; and displaying on the display screen (i) a fourth numeric value representative of the cumulative time-of-flight, and (ii) a fifth numeric value representative of the greatest time-of-flight. The calculated approximate time-of-flights of the skier or snowboarder over the first, second, and third period of times may then be compared to determine (iii) the average time-of-flight over the first, second, and third period of times. The average time-of-flight may then be displayed on the display screen as (iii) a sixth numeric value representative of the average time-of-flight over the first, second, and third period of times.

In yet another embodiment, computer readable instructions are used for determining the time-of-flight of an object. The computer readable instructions are implemented in any type of device which might benefit from the measuring of time-of-flight, whether the device is a hang-timer device, a cellular phone, or an MP3 player. For example, a cellular phone might employ the computer readable instructions so that vital hardware is protected (shut-off or locked, as may be the case) before the cellular phone drops to the ground. Having the ability to measure changes in static acceleration may be vital in protecting such a device.

Thus, the computer readable instructions may comprise of measuring a first static acceleration and a second static acceleration using an accelerometer, and then computing a first change in magnitude from the first static acceleration to the second static acceleration, where the first change in magnitude corresponds to a take-off event of an object (for example, when the cellular phone falls out of the hands of an individual) and computing a following second change in magnitude from the second static acceleration back to the first static acceleration, where the second change in magnitude corresponds to a landing event of the object (when the cellular phone hits the ground). The same technology may be used to protect MP3 players and all other kinds of devices, whether CD players, gaming devices, and other equivalent electronic devices which may benefit from knowing beforehand when they will hit the ground.

Figure 6A:
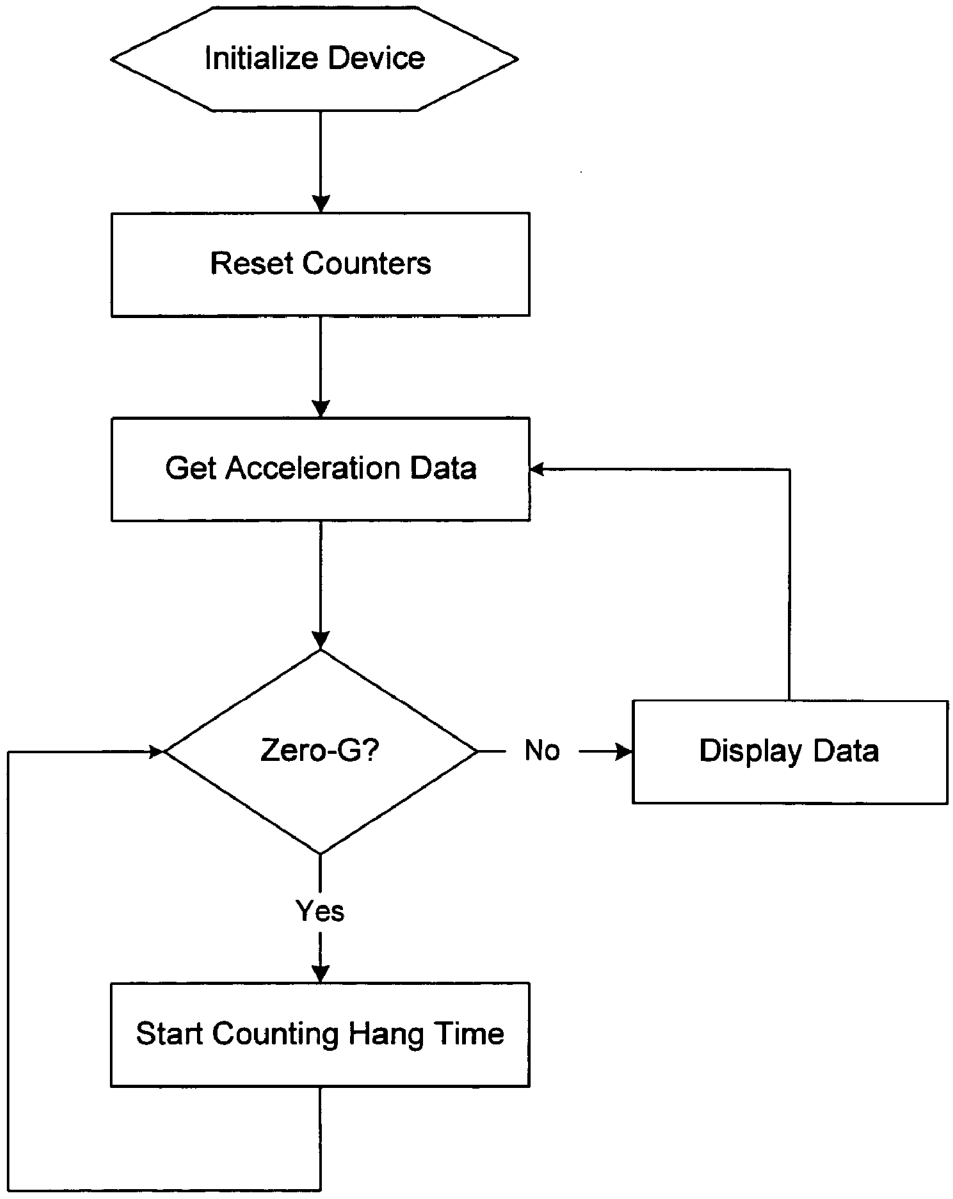
FIG. 6A is a high level flow chart that depicts certain steps associated with calculating the time-of-flight or hang-time of an object in accordance with an embodiment of the present invention.

A high level flow chart that depicts certain steps associated with calculating the time-of-flight or hang-time of an object in accordance with an embodiment of the present invention has been provided as FIG. 6A. The device is initialized 600 and any counters are reset 602. Next, the static acceleration data is gathered 604 and either there is a zero gravity condition 606 or there is not. If there is a zero gravity condition 606, the hang-time is counted 608. The hang-time is counted 608 and static acceleration data is gathered 604 until the zero gravity condition 606 does not exist anymore. Once there is no more zero gravity 606, the hang-time is displayed 610, since in such a situation a user of the device must be on the ground. Exemplary pseudo code that corresponds to the flow chart of FIG. 6A has been provided as FIG. 6B.

Figure 7B:
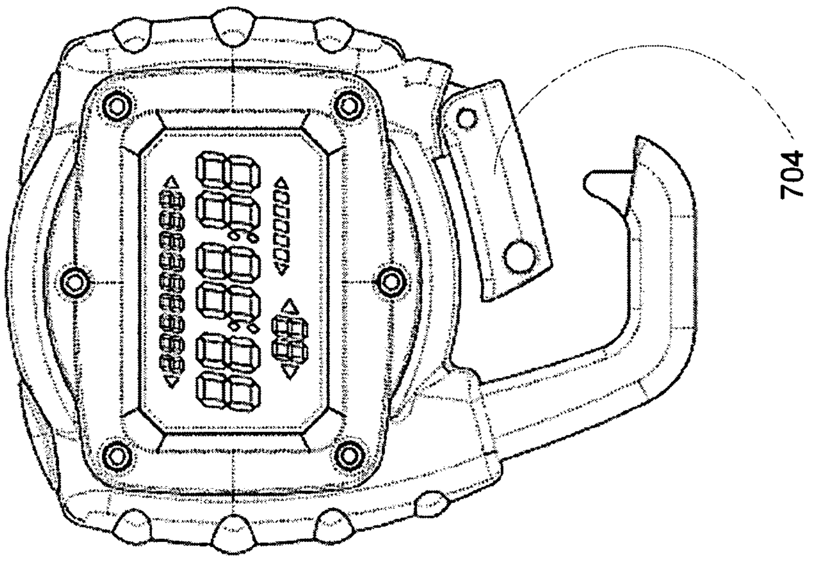
FIGS. 7A, 7B, and 7C illustrate a biding or latching mechanism with a securing mechanism that may be used as part of the hang-timer device.
Figure 7A:
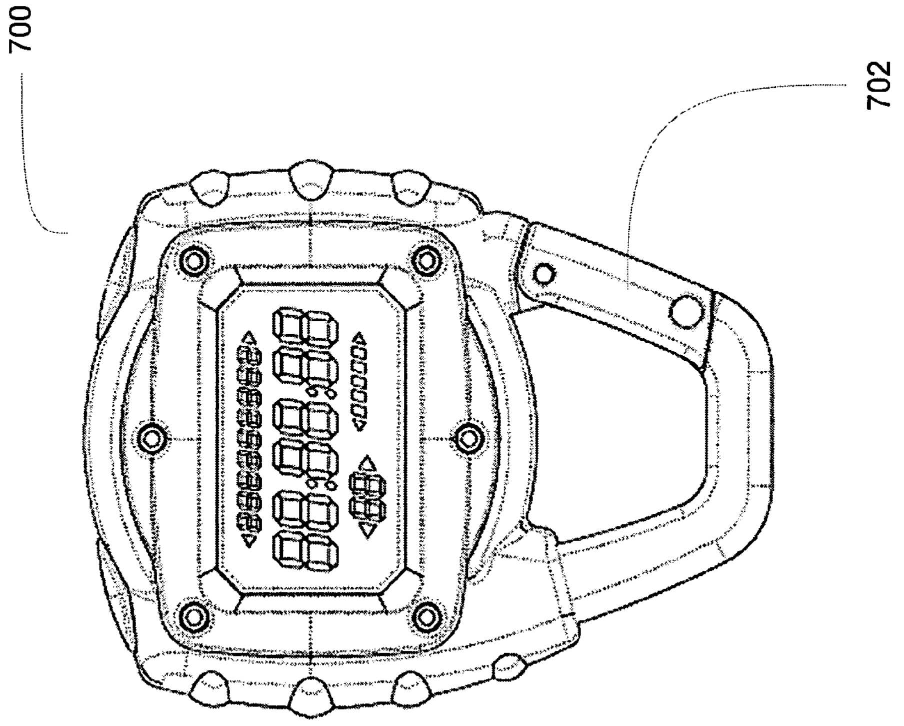
Figure 7C:
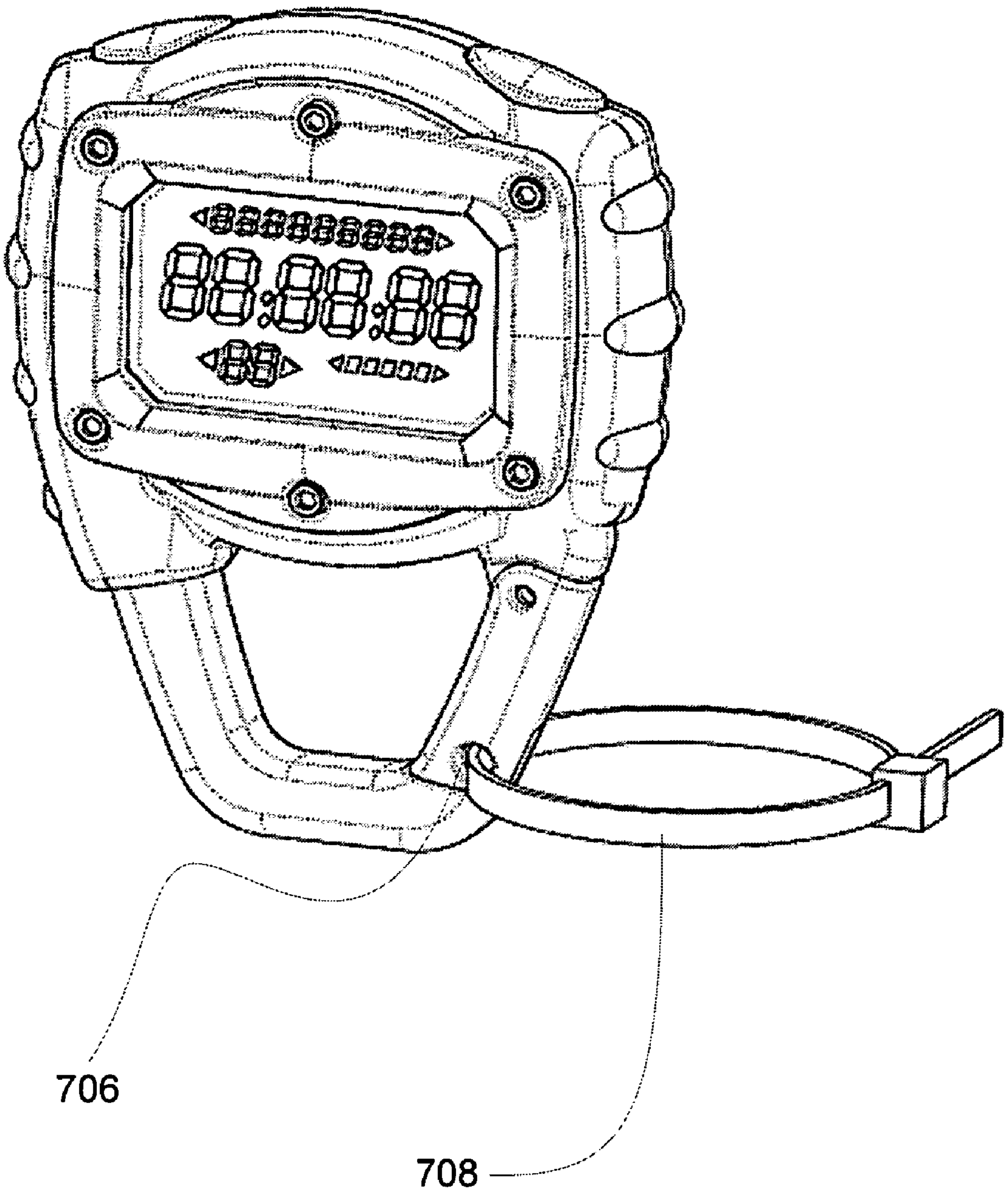

In another embodiment, FIGS. 7A-7C depict a biding or latching mechanism with a securing mechanism that may be used as part of the hang-timer device. For example, FIG. 7A shows that the latching mechanism can be a carabiner 702, and FIG. 7B shows how that the carabiner opens up 704 so as to either attach the hang-timer 700 to a wearer or detach the hang-timer from a wearer. Interestingly, FIG. 7C illustrates that the securing mechanism may be a tie wrap 708. An aperture 706 in the carabiner allows the tie wrap 708 to secure the hang-timer 700 to a wearer. Such securing may ensure that the hang-timer is not merely thrown-up in the air to record a hang-time that was not actually obtained by the wearer. Thus, in one context, the securing mechanism may be construed as an anti-cheating mechanism, ensuring that the only hang-times that will be recorded are those actually obtained by the wearer of the hang-timer. However, the latching and securing mechanisms may be used for other purposes, as will be readily recognized by those skilled in the art.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions and all changes that come within the meaning and range of equivalency of the claims are to be embraced within their scope.

What is claimed:

1. A device, comprising:

a housing;

at least one accelerometer disposed within the housing, the at least one accelerometer being configured to detect a static acceleration of the device during a time-of-flight event, and being further configured to provide an accelerometer output electrical signal indicative of the static acceleration of the device during the time-of-flight event;

a microprocessor in electrical communication with the at least one accelerometer, the microprocessor being configured to calculate an approximate time-of-flight of the device during the time-of-flight event from the accelerometer output electrical signal, the microprocessor being further configured to provide a microprocessor output electrical signal indicative of the calculated time-of-flight of the device during the time-of-flight event;

a memory component for storing the calculated time-of-flight, wherein the calculated time-of-flight is configured to be used by a user of the device; and wherein the microprocessor is further configured to calculate a greatest time-of-flight selected from the time-of-flight and an additional time-of-flight.

2. A device, comprising:

a housing;

at least one accelerometer disposed within the housing, the at least one accelerometer being configured to detect a static acceleration of said device during a time-of-flight event, and being further configured to provide an accelerometer output electrical signal indicative of the static acceleration of the device during the time-of-flight event;

a microprocessor in electrical communication with the at least one accelerometer, the microprocessor being configured to calculate an approximate time-of-flight of the device during the time-of-flight event from the accelerometer output electrical signal, the microprocessor being further configured to provide a microprocessor output electrical signal indicative of the calculated time-of-flight of the device during the time-of-flight event and to calculate a greatest time-of-flight selected from the time-of-flight and an additional time-of-flight; and a memory component for storing the calculated time-of-flight, wherein the calculated time-of-flight is configured to be used by a user of the device;

wherein the housing includes a latching mechanism that is designed to latch the device to a wearer and designed to be removable from the wearer.

3. The device of claim 2, wherein the latching mechanism has a securing mechanism designed to ensure that the wearer is latched to the device during the time-of-flight event.

4. A device for determining the hang-time of an object, comprising:

an accelerometer, wherein the accelerometer is configured to measure a first static acceleration and a second static acceleration;

a computing device, wherein the computing device is configured to determine a first change in magnitude from the first static acceleration to the second static acceleration, wherein the first change in magnitude corresponds to a take-off event of the object, and wherein the computing device determines a following second change in magnitude from the second static acceleration back to the first static acceleration, wherein the second change in magnitude corresponds to a landing event of the object, and wherein a current time-of-flight is calculated based on the first change in magnitude, during the take-off event, and the second change in magnitude, during the landing event;

a storage device for storing the current time-of-flight, wherein the current time-of-flight is configured to be used by a user of the device; and wherein the computing device is configured to determine a subsequent time-of-flight, and wherein the computing device is further configured to determine a greatest time-of-flight based on the current time-of-flight and the subsequent time-of-flight.

5. A method for determining approximate time-of-flights of an individual who moves, jumps, and lands a plurality of times along a surface, the individual having a first static acceleration when the individual is on the surface, and a second static acceleration when the individual is off of the surface, the method comprising:

securing a device housing to the individual at or near a center of mass of the individual;

detecting, by use of at least one accelerometer secured within said housing, the first and second static acceleration of the individual over a first period of time as the individual moves, jumps in a first trajectory, and lands for a first time along the surface thereby defining a first time-of-flight event;

calculating from the detected first and second static acceleration over the first period of time an approximate time-of-flight of the individual during the first time-of-flight event, wherein the time-of-flight begins when the first static acceleration changes to the second static acceleration and ends when the second static acceleration changes back to the first static acceleration, wherein the first and second static acceleration are separated in magnitude a predetermined unit of gravity; and storing the first time-of-flight for use by the individual.

6. The method of claim 5, wherein the predetermined unit of gravity is about 1 g.

7. The method of claim 5, further comprising detecting a third and fourth static acceleration of the individual over a second period of time as the individual moves, jumps in a second trajectory, and lands for a second time along the surface thereby defining a second time-of-flight event.

8. The device of claim 5, providing the housing with a mechanism for binding the housing to the individual such that the housing and the individual jump substantially similarly.

* * * * *